Feb. 17, 1942.                F. W. JOHNSON                 2,273,359
                          MATERIAL HANDLING MACHINE
                            Filed Oct. 28, 1940           7 Sheets-Sheet 1

FIG.1

INVENTOR
FREDERICK W. JOHNSON
BY
Harry C. Schroeder

Feb. 17, 1942.  F. W. JOHNSON  2,273,359
MATERIAL HANDLING MACHINE
Filed Oct. 28, 1940  7 Sheets-Sheet 4

FIG. 4

INVENTOR
FREDERICK W. JOHNSON
BY
Harry C. Schroeder

Feb. 17, 1942.    F. W. JOHNSON    2,273,359
MATERIAL HANDLING MACHINE
Filed Oct. 28, 1940    7 Sheets-Sheet 6

INVENTOR
FREDERICK W. JOHNSON
BY
Harry C. Schroeder

Feb. 17, 1942.　　　　F. W. JOHNSON　　　　2,273,359
MATERIAL HANDLING MACHINE
Filed Oct. 28, 1940　　　　7 Sheets-Sheet 7

INVENTOR
FREDERICK W. JOHNSON
BY

Patented Feb. 17, 1942

2,273,359

UNITED STATES PATENT OFFICE 2,273,359

MATERIAL HANDLING MACHINE

Frederick W. Johnson, Santa Cruz, Calif.

Application October 28, 1940, Serial No. 363,071

3 Claims. (Cl. 214—103)

This invention relates to mechanisms for handling fragmented material such as dirt or gravel.

It is an object of the invention to provide a low-cost mechanism of the class described.

Another object of the invention is to provide a machine of the class described particularly adapted for road construction or the like work.

A further object of the invention is to provide a machine of the character described which may be easily and rapidly maneuvered.

Still another object of the invention is to provide a material handling machine which may be instantly adapted to carry material, such as lumber, other than the fragmented material for which it is primarily designed.

Yet another object of the invention is to provide, in a machine of the class described, an improved hoisting arrangement.

Another object of the invention is to provide, in the hoisting mechanism above referred to, a novel safety ratchet and drum brake.

The invention possesses other objects and features of advantage which, together with the foregoing, will be specifically set forth in the detailed description of the invention hereunto annexed. It is to be understood that the invention is not to be limited to the specific form thereof herein shown and described as various other embodiments thereof may be employed within the scope of the appended claims.

Referring to the drawings.

In detail, the machine comprises a mobile carriage having a frame 16 below the forward end of which is positioned a transversely extending live axle 17, carrying a pair of ground-engaging drive wheels 18, and below the front end of which is positioned a transversely extending dead axle 19 carrying a pair of ground-engaging dirigible wheels 21. Cantilever springs 22, carried by brackets 23 secured to the frame, attach the axle 17 to the frame and the axle 19 is attached to the frame by a semi-elliptic spring 24 carried by a bracket 26. Radius rods 27, secured at one end by bolts 28 to the axle 19, are attached to a swivel joint 29, supported on the flywheel housing 31 of an internal combustion motor 32 mounted on motor supports 33, and serve to stabilize the axle. Similar radius rods 34 are secured to the axle 17 and are engaged with a swivel joint, not shown, carried by a transverse cross member 36 mounted in the frame 16. A suitable hood structure 37 covers the motor 32 and the latter is provided with the usual radiator 38. The motor 32 is direct-connected to a selective sliding gear transmission 39 which drives a propeller shaft, contained within the torque tube 41, which, in turn, drives the axle rotating the drive wheels 18. A shift lever 42 is provided on the transmission 39 for effecting the desired gear changes. A platform 43 mounted on top, and transversely, of the frame 16 supports an operator's seat 44 and is positioned so that the operator is within convenient reach of the lever 42 and other of the controls which will be described later. The dirigible wheels 21 are tied for simultaneous angular movement together by a tie rod 46, and are steered by a drag link 47 pivotally attached to the lower end of a tiller lever 48 pivotally mounted on, and extending upwardly through an opening 49, in the platform 43 and provided at its upper end with a handle bar 51 which may be gripped by the operator to move the tiller lever 48 back and forth and thereby steer the machine. A pair of foot pedals 52 and 53 are pivotally mounted on the platform 43 just forward of the tiller lever 48, the former being connected by a pull rod 54 with the lever 56, operating the clutch contained within the housing 31, and the latter being connected by a pull rod 57 with one lever carried by a rocker shaft 58, journaled in brackets 59 carried by the frame 16, other levers 61 being also provided on the rocker shaft which are connected to pull rods 62 attached to levers 63 on the axle 17 which operate suitable brakes for resisting rotation of the drive wheels 18. A hand lever 64, which projects upwardly through an elongated opening 66, formed in the platform 43, is connected to a second rocker shaft 67, journaled in bearings 68 carried by the frame 16, having levers 69 which are connected to pull rods 71 operating auxiliary brakes in the axle 17. A foot throttle 72, slidably mounted in a bracket 73 carried by the frame 16, is provided within convenient reach of the operator's foot and is connected to control the flow of fuel to the motor 32. Thus an operator, seated in the seat 44, may, by manipulating the various controls previously described, move the machine back and forth, steer it to the right or left, or stop it by application of the brakes.

Mounted on and rising from the end of the frame 16 adjacent the drive axle 17, is a pair of inclined rails 74, each being slightly inclined from the vertical and stabilized by brace bars 76 which are attached at one end to the rails by bolts or rivets 77 and at their lower ends are secured to the frame 16 at points substantially medially of the ends of the latter. Each rail is of T-shaped cross section, being composed of a pair of angle bars bolted or otherwise secured together, and each is provided with a bearing strip 78 which extends substantially the entire length of the rails. A pair of grooved pulleys 79 is provided at the upper ends of the rails 74 being journaled on a shaft 81 which ties the upper ends of the rails together and which passes through and is secured in, by nuts 82, housing 83 enclosing the pulleys 79. A buffer plate 84 is welded or otherwise secured to the lower ends of the rails 74 and extends transversely across the end of the machine. Steel cables 86, passing over the pulleys 79, extend downwardly along both sides of the rails 74 and are attached, at one end, to a grapple bar 87 provided at each end thereof with a depending hook 88. Links 89 pivotally connect the hooks 88 with the bar 87. A sheet metal bucket is provided having a bottom 91 with a rear wall 92 and side walls 93 rising from and secured, such as by welding, to the edges thereof. One wall of the bucket is omitted so that the latter has an open side. The rear wall 92 is extended downwardly beyond the bottom sheet 91 so as to form a flange 94 and angle bars 96, welded to the bottom sheet, provide feet upon which the bucket is supported while resting on the ground. A pair of side bars 97 are welded to and extend above the top edges of the side walls 93 and are each provided with a peg 98 which slopes slightly downwardly toward the bottom of the bucket. The rear wall 92 of the bucket is adapted to lie against the surface of the buffer plate 84 and the hooks are adapted to engage the pegs 98 so that when a pull is imposed upon the cables 86 the bucket will be raised along the rails 74. The slope of the rails 74 causes, when the bucket is loaded, a desirable frictional engagement between the rear wall of the bucket and the bearing strips 78 so that undue swaying of the bucket is resisted when the machine is moving particularly when turns are being negotiated.

Powered means is provided for raising the bucket. The transmission casing 39 is provided with a side opening, to the flange 99 of which is attached the flange 101 of a casing 102 enclosing a power take-off gear which drives an auxiliary shaft 103. The construction of the power take-off gear is well known to those skilled in the art and comprises a sliding gear which may be shifted, by a control lever 104 into and out of mesh with the reverse idler gear of the regular transmission 39 so that the shaft 103 may be selectively connected with and to be driven by the motor 32. The shaft 103 is connected, through a universal joint 105, with a shaft 106 which extends toward the drive axle 17 and is journaled in a bearing 107 carried by a bracket 108 which is mounted on a cross-member 109 extending transversely between the frame members 16. A sprocket 111 is fixed to and for rotation with the shaft 106 and meshes with an endless chain 112 which extends upwardly and meshes with a larger sprocket 113 secured to and for rotation with a shaft 114 journaled in a bearing 116, carried by the cross-member 109, and extending into a jack-shaft casing 117 mounted above and paralleling the drive axle 17 and secured to the frame members 16 by brackets 118. The shaft 114 is connected, within the casing 117 and through suitable worm gearing, not shown, to drive the jack-shaft 119. Winch drums 121 are keyed to and to rotate with the jack-shaft and an end of each cable 86 is fastened to and wound around the drums. It will be seen that when the lever 104 is operated to engage the power take-off gear with the gearing of the transmission 39 and the motor clutch is engaged with the motor running and the regular transmission in neutral, the shaft 106 will be driven by the motor thereby causing the winch drums 121 to rotate and to reel in the cables 86 thereby hoisting the bucket along the rails 74.

Figures 8, 9, 10:
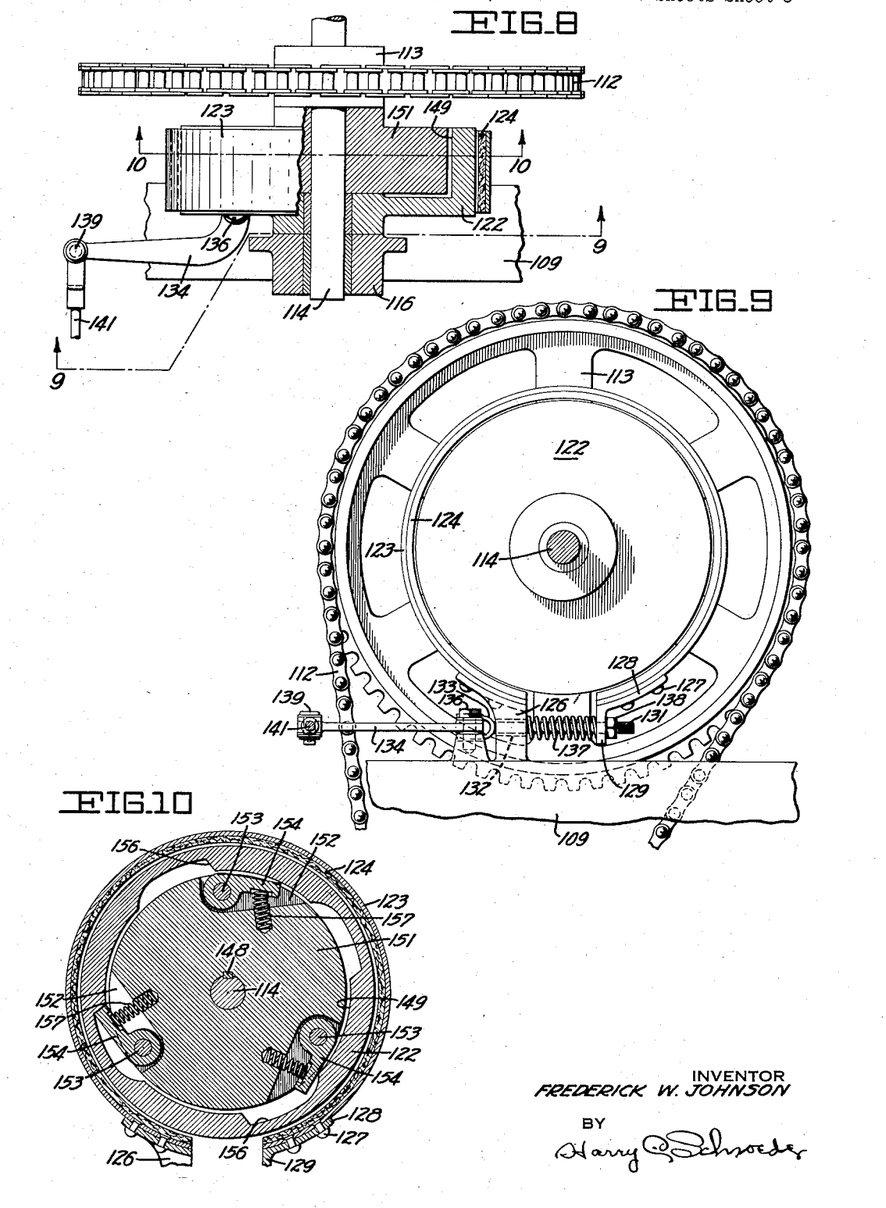
Figure 8 is a fragmental plan view, partly in section, of the hoisting drum ratchet and brake.
Figure 9 is a view, for the most part in front elevation, of the structure shown in Figure 8. The plane in which the view is taken is indicated by the line 9—9 of the latter figure.
Figure 10 is a vertical sectional view of the mechanism shown in Figure 8. The plane of section is indicated by the line 10—10 of the latter figure.

Means is provided for releasably holding the bucket in its elevated position and means is also provided for variably resisting the speed of descent of the bucket from its elevated to its lowered positions. As is best shown in Figures 8 to 10 inclusive, the shaft 114 has journaled thereon a cylindrical brake drum 122 encircled by a brake band 123 carrying a friction lining 124. One end of the brake band 123 is anchored by a bracket 126 to the cross-member 109, and the other end of the brake band has attached thereto, by rivets 127 a clip 128 whose radially extending flange 129 is apertured to receive a pull rod 131. The pull rod passes through a clearance aperture 132 in the anchor bracket 126 and is provided with a clevis 133 which is pivotally connected to a lever 134 mounted, by a pivot screw 136, on the cross-member 109. A coil spring 137 concentric with the pull rod 131, is interposed between the flange 129, of the clip 128, and the anchor bracket 126 and serves to spread the ends of the brake band apart, when pressure on the pull rod 131 is released, so as to loosen the brake band about the brake drum. A nut 138 threaded on the end of the pull rod 131 serves to adjustably tighten the brake band relative to the brake drum. The lever 134 is fitted with a pivot pin 139 to which is attached one end of a pull rod 141, the other end of the pull rod being pivotally connected to an operating lever 142 pivotally mounted, by a bracket 143, on the platform 43. A coil spring 144, connected at one end to the lever 134 and at the other end to an anchor bolt 146 mounted on the platform 43, serves to forcibly and releasably maintain the brake-band 124 in frictional engagement with the brake drum 122 so as to prevent rotation of the latter. A spur 147 secured to and extending horizontally from the side of the control lever 142 may be engaged by the foot of the operator.

Secured to and for rotation with the shaft 114 by a key 148 and positioned within a cylindrical recess 149, formed in the brake drum 122, is a ratchet rotor 151 having in its periphery a plurality of spaced recesses 152 in which are pivotally mounted by means of pins 153, pawls 154 whose distal ends are adapted to engage in notches 156 formed in the periphery of the recess 149. Coil springs 157, interposed between the pawls and the bottoms of the recesses 152, serve to resiliently urge the pawls into engagement with the notches 156.

As the cables 86 are being reeled onto the drums 121, the shaft 114, as viewed in Figure 10, will be rotating in a counterclockwise direction so that the pawls 154 are moved past the successive notches 156 in the brake drum 122 which is held stationary by the spring-pressed brake band 123. When the bucket has been elevated to the desired position, the operator depresses the clutch pedal 52 and disconnects the power take-off mechanism from the motor 32 by manipulating the lever 104. The bucket is now held in its elevated position by the engagement of one of the pawls 154 with a notch 156 of the stationary brake drum 122. When it is desired to lower the bucket, the operator, either manually or by his foot, moves the control lever 142 so as to slightly release the pressure of the brake band 123 on the brake drum whereupon the brake drum and the ratchet rotor 151 are permitted to rotate thereby paying out the reeled cables 86 from the drums 121 and allowing the bucket to descend. To accomplish this, the worm gearing within the jack shaft housing 117 will, of course, have to be reversible, that is, capable of transmitting rotation between the drive and driven shafts regardless of which of the shafts the driving torque is applied to.

Figure 1:
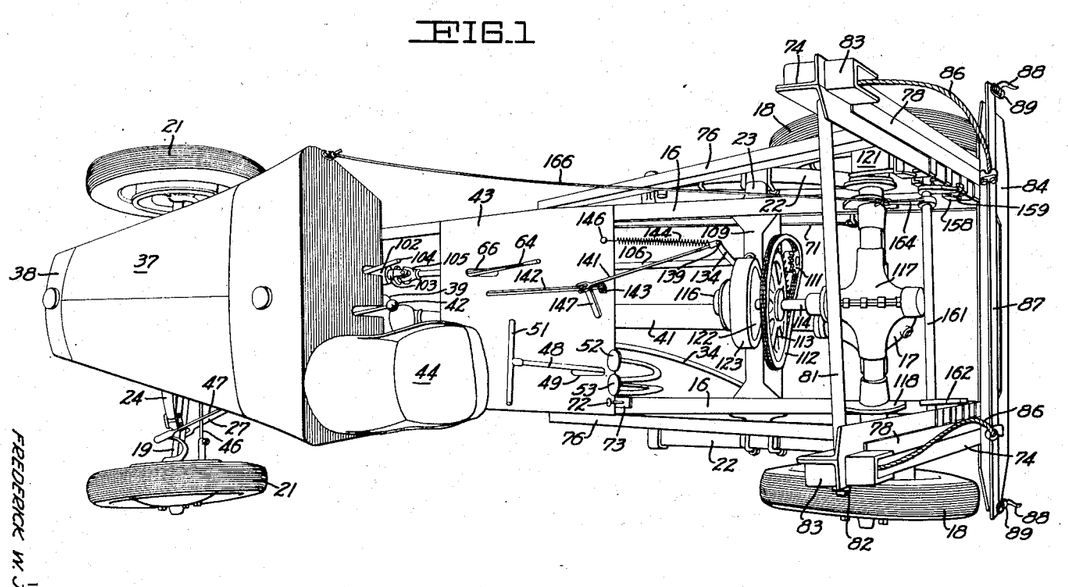
Figure 1 is a top perspective view of the machine of my invention.
Figure 2:
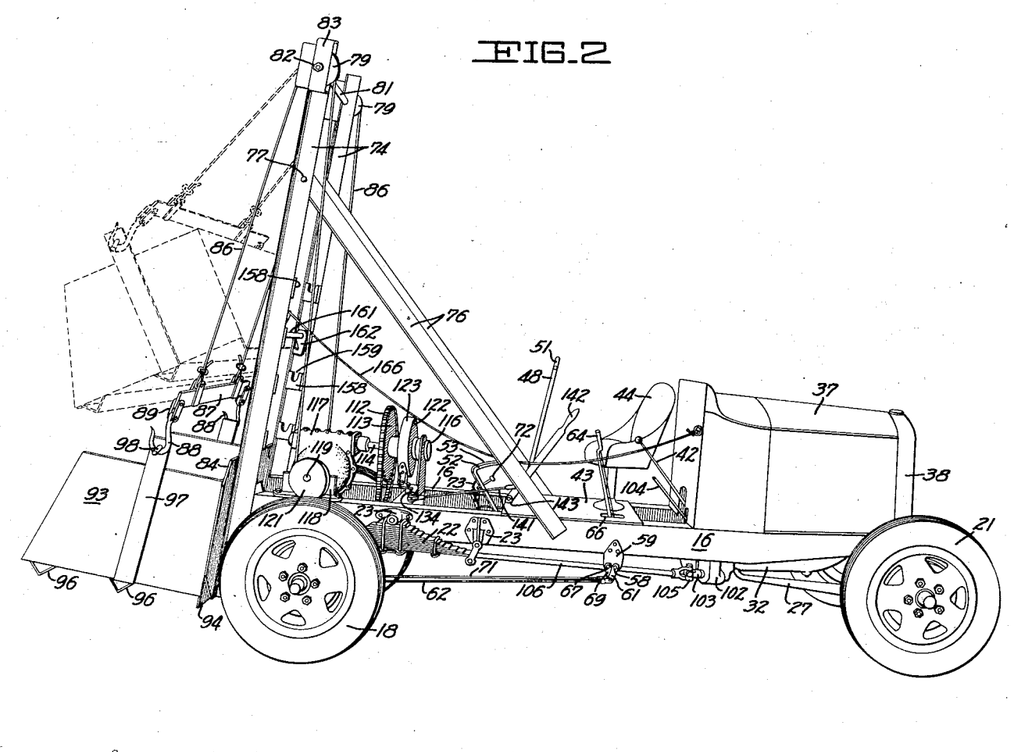
Figure 2 is a side perspective view of the machine.
Figure 3:
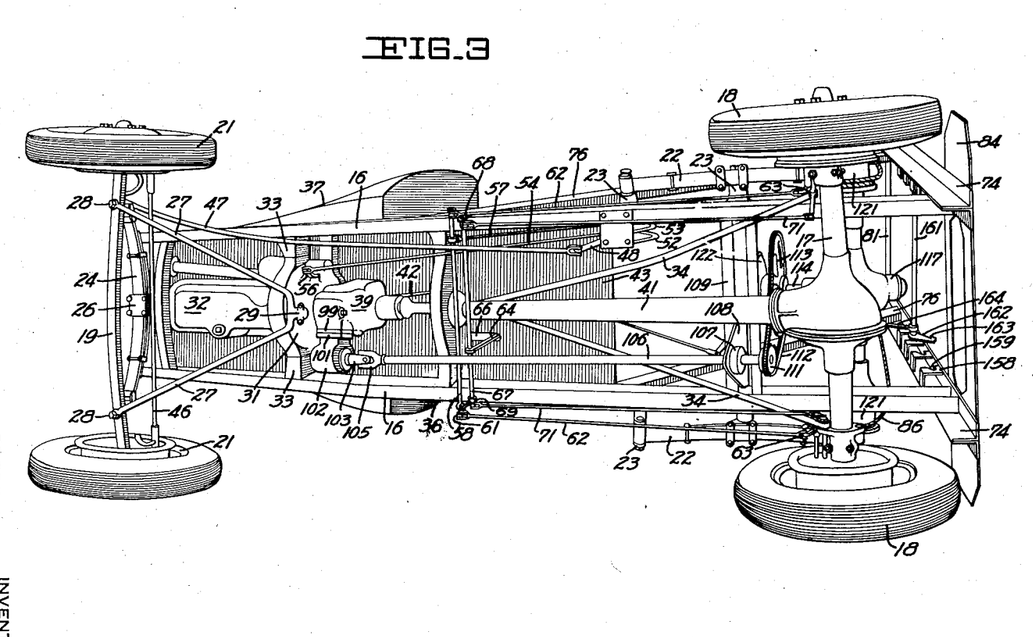
Figure 3 is a bottom perspective view of the machine.
Figure 4:
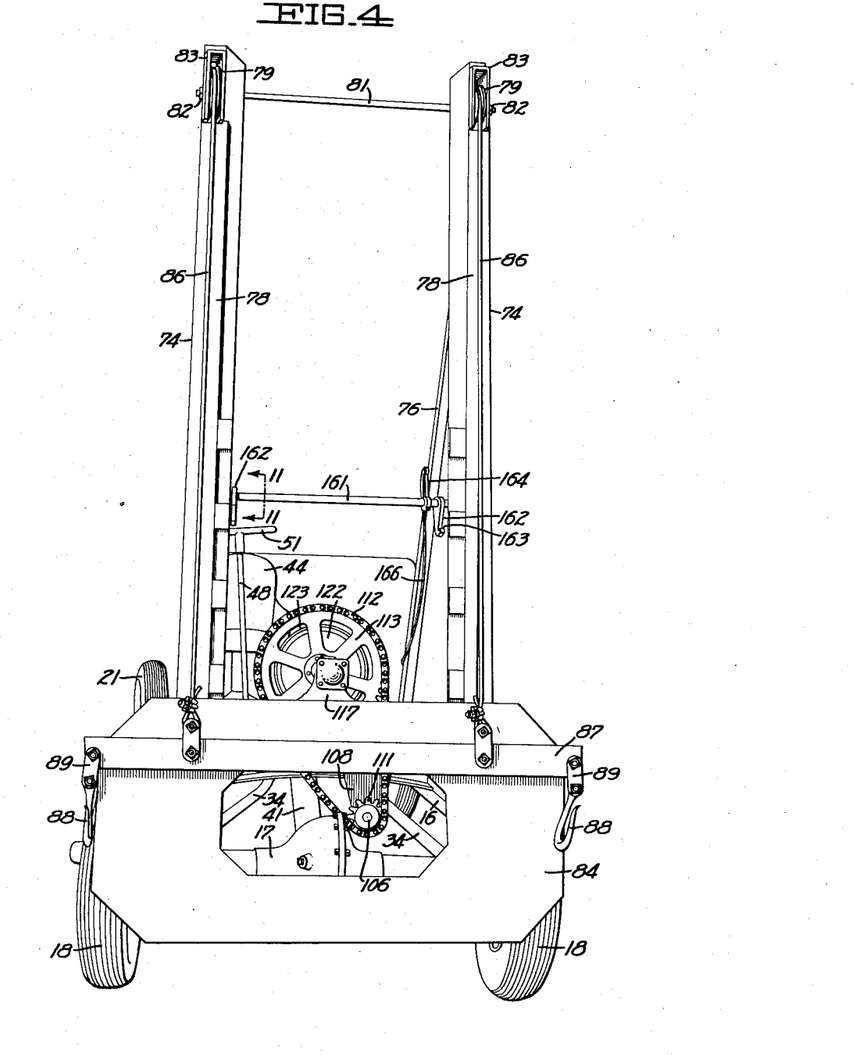
Figure 4 is an end perspective view of the machine.
Figure 5:
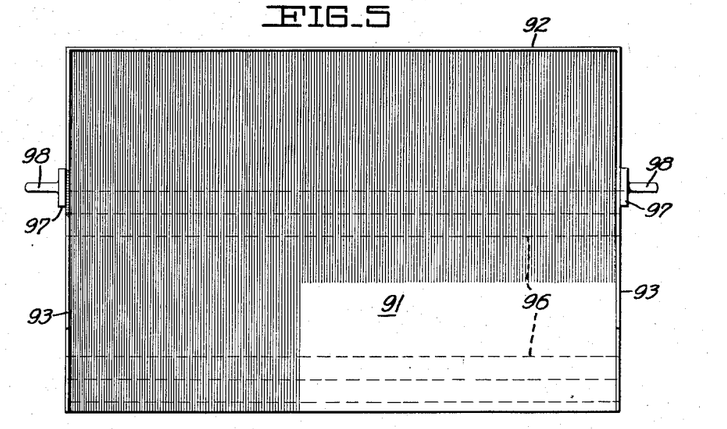
Figure 5 is a top plan view of the bucket.
Figure 6:
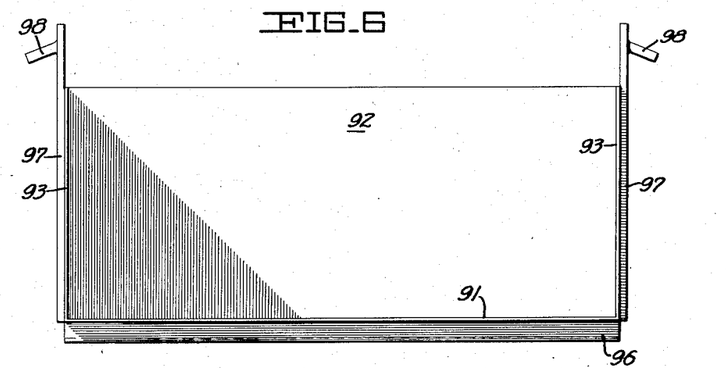
Figure 6 is a front elevational view of the structure shown in Figure 5.
Figure 7:
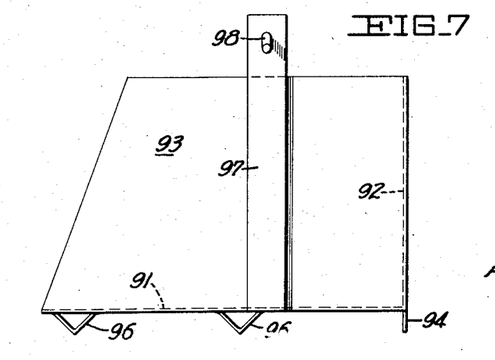
Figure 7 is a side elevational view of the structure shown in Figure 6.
Figure 11:
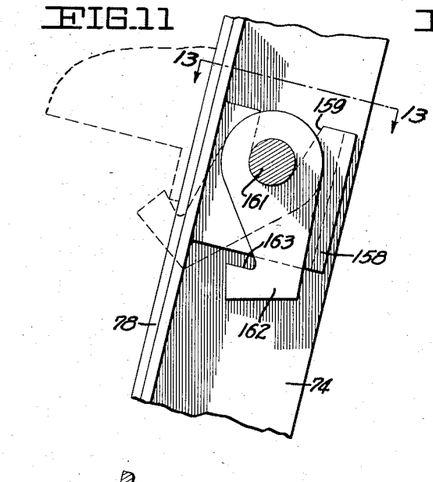
Figure 11 is an enlarged vertical sectional view of a portion of one of the hoist rails. The plane in which the view is taken is indicated by the line 11—11 of Figure 4.
Figure 12:
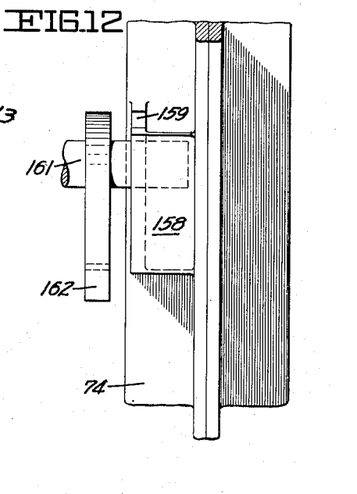
Figure 12 is a side elevational view of the structure shown in Figure 11.
Figure 13:
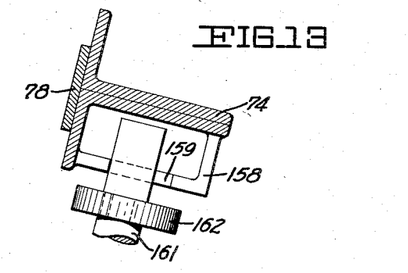
Figure 13 is a horizontal sectional view of the structure shown in Figure 11. The plane in which the view is taken is indicated by the line 13—13 of the latter figure.
Figure 14:
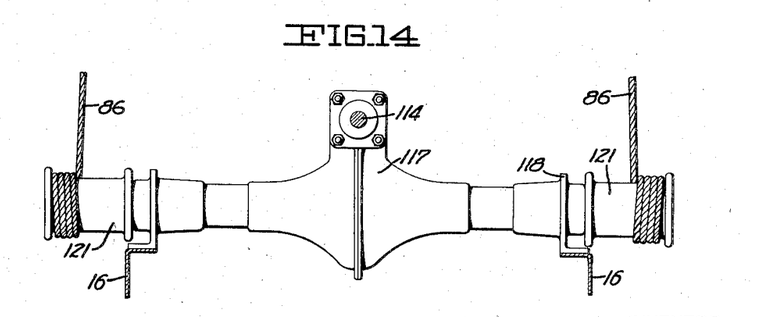
Figure 14 is a front elevational view of the hoisting mechanism jack shaft.

Means is provided for tilting the bucket, after the latter has been elevated to the desired position, so that the contents of the bucket may be dumped. Welded to the confronting inner side surfaces of the rails 74 are vertically spaced pairs of angle clips 158 each being provided with an upwardly opening notch 159 in which an end of a latch shaft 161 may be removably seated. The clips 158 are stationed at intervals a foot or so apart or at any other elevations to which the bucket is to be elevated. At each end of the latch shaft 161 is secured a latch lever 162 having at its distal end a notch 163 which faces the surface of the rails along which the bucket slides. A lever 164, secured to the latch shaft, has a cord 166 attached thereto which extends to a point within convenient reach of the operator. The latch shaft 161 is positioned in an opposed pair of the notches 159 adjacent the desired elevation from which the bucket is to be dumped. The previously loaded bucket is now attached to the cables 86, by engaging the hooks 88 under the pegs 98, and the bucket is elevated, as was described above, to a point slightly above the position of the latch shaft 161. The operator next pulls on the cord 166 which moves the latch levers to the position shown by the dotted lines of Figure 11 so that the notches 163 will project slightly beyond the face of the rails 74. Holding the latch levers in this position, the operator now slightly releases the brake band 123 whereupon the bucket will descend until the flange 94 enters and seats in the notches 163. This anchors the rear bottom edge of the bucket to the rails. Additional release of the brake band will cause the front end of the bucket to descend further with the result that the bucket will move into the tipped position shown by the dotted lines of Figure 2, thereby permitting the material contained in the bucket to pour therefrom through the open side thereof. After dumping, the bucket is again hoisted to free the flange 94 from the latch lever notches 163 whereupon the latch levers will swing, by gravity, to their positions below the bearing surface of the rails thereby permitting the bucket to be lowered to the ground.

It is evident that by disconnecting the bucket and engaging the hooks 88 with the cables 86 to form slings materials such as lumber and the like may be readily handled which could not be conveniently handled in the bucket. It will also be seen that by lowering the bucket nearly to the ground, the machine may be readily adapted for ground leveling or light grading work.

Having thus described my invention in detail, what I claim as new and desire to secure by Letters Patent is:

1. In a machine of the character described, a frame, a motor mounted on said frame, vertically extending inclined rails mounted on said frame, a bucket for containing material to be handled and slidable along said rails, hoisting mechanism on said frame and connected with and to move said bucket along said rails, means connecting said hoisting mechanism to be driven by said motor, means to be selectively positioned at spaced points along said rails and movable to engage said bucket for releasably securing said bucket to said rails, and means for moving said bucket securing means into the path of movement of and to engage said bucket.

2. In a machine of the character described, a frame, a motor mounted on said frame, vertically extending inclined rails mounted on said frame, said rails each having a bearing surface thereon, a bucket for containing material to be handled and slidable along the bearing surfaces of said rails, said bucket having thereon a flange positioned adjacent said bearing surfaces of the rails, hoisting mechanism on said frame and connected with and to move said bucket along said bearing surfaces of the rails, means connecting said hoisting mechanism to be driven by said motor, clips secured to and spaced vertically along said rails, each of said clips having therein an upwardly opening notch, a latch shaft removably insertible in and journaled in the notches of opposed pairs of said clips, latch levers secured to said latch shaft adjacent the opposite ends thereof, said latch levers, when said latch shaft is rotated, being movable beyond said bearing surfaces of the rails and engageable with the flange of the bucket so that the bucket may be secured to said rails, and means for rotating said shaft.

3. In a machine of the character described, a frame, a motor mounted on said frame, a pair of vertically extending inclined rails mounted on said frame, said rails each having a bearing surface thereon and being provided adjacent its upper end with a rotatable pulley, a bucket for containing material to be handled slidable vertically along the bearing surfaces of said rails, said bucket having along the lower edge thereof adjacent said rails a downwardly extending flange, hoist cables detachably secured at one end to said bucket and passing over said pulleys, a jack-shaft mounted on said frame, winch drums carried by said jack shaft and to which the other ends of said cables are attached, a drive shaft extending from said jack-shaft, a recessed cylindrical brake drum journaled on said drive shaft, said brake drum within the recess thereof being provided with a plurality of circumferentially spaced ratchet notches, a ratchet rotor positioned within said brake drum recess and secured to and for rotation with said drive shaft, spring-pressed ratchet pawls pivotally mounted on said ratchet rotor and engageable in the ratchet notches of said brake drum, a contractible brake band encircling said brake drum, manually releasable spring-pressed means contracting said brake band about said brake drum so as to fix said brake drum against rotation, a power take-off shaft journaled on said frame and selectively engageable with and to be rotated by said motor, means connecting said power take-off shaft and said drive shaft for rotation together, vertically spaced, horizontally alined, pairs of clips secured to said rails, said clips each having therein an upwardly opening notch, a latch shaft extending horizontally between said rails and having its respective ends journaled in an opposed pair of said clip notches, latch levers carried by said latch shaft and movable, when the latch shaft is rotated, outwardly beyond the bearing surfaces of the rails into the path of movement of said bucket, said latch levers each having therein a notch in which the said flange of the bucket may be engaged so as to secure said bucket to the rails, and manually operable means secured to and extending from said latch shaft for rotating said latch shaft.

FREDERICK W. JOHNSON.